(12) United States Patent
Nishiyama

(10) Patent No.: US 9,346,436 B2
(45) Date of Patent: May 24, 2016

(54) ELECTRONIC KEY SYSTEM

(71) Applicant: TOYOTA JIDOSHA KABUSHIKI KAISHA, Toyota-shi, Aichi-ken (JP)

(72) Inventor: Shigeki Nishiyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/613,030

(22) Filed: Feb. 3, 2015

(65) Prior Publication Data

US 2015/0274126 A1 Oct. 1, 2015

(30) Foreign Application Priority Data

Mar. 28, 2014 (JP) ................... 2014-070432

(51) Int. Cl.
*G06F 17/00* (2006.01)
*B60R 25/24* (2013.01)

(52) U.S. Cl.
CPC .................... *B60R 25/245* (2013.01)

(58) Field of Classification Search
CPC .... B60R 25/24; G07C 9/00309; G06F 3/153; G06F 7/00
USPC ............ 701/2, 31.4, 36; 340/3.51, 4.34, 5.61, 340/5.72; 713/180, 500; 327/517
See application file for complete search history.

(56) References Cited

U.S. PATENT DOCUMENTS

| | | | | |
|---|---|---|---|---|
| 2003/0109972 A1* | 6/2003 | Tak | ......... | G06Q 10/02 701/31.4 |
| 2008/0059806 A1* | 3/2008 | Kishida | ......... | G06F 21/35 713/186 |
| 2008/0276113 A1* | 11/2008 | Tabeta | ......... | G06F 1/08 713/500 |
| 2010/0007462 A1* | 1/2010 | Biondo | ......... | G08C 17/02 340/5.72 |
| 2012/0158214 A1* | 6/2012 | Talty | ......... | B60R 25/24 701/2 |
| 2012/0158244 A1* | 6/2012 | Talty | ......... | B60R 25/24 701/36 |
| 2013/0090783 A1 | 4/2013 | Katou | | |
| 2013/0176069 A1* | 7/2013 | Leong | ......... | B60R 25/24 327/517 |

FOREIGN PATENT DOCUMENTS

| | | |
|---|---|---|
| JP | 4349191 B2 | 10/2009 |
| JP | 2012026141 A | 2/2012 |
| JP | 2013083051 A | 5/2013 |

* cited by examiner

*Primary Examiner* — McDieunel Marc
(74) *Attorney, Agent, or Firm* — Oliff PLC

(57) ABSTRACT

An electronic key system wirelessly transmits a polling signal at predetermined time intervals into a predetermined transmission area outside a vehicle interior and detects an electronic key by receiving a response signal transmitted from the electronic key that is in the transmission area in response to the polling signal, and causes a predetermined function of an on-vehicle apparatus to be executed when the electronic key is detected. The electronic key transmits the polling signal into an enlarged transmission area which is enlarged from the predetermined transmission area when a state where the electronic key is detected and a state where the electronic key is not detected are repeated a predetermined number of times or more within a predetermined time, and does not cause the predetermined function to be executed when the electronic key is detected from the enlarged transmission area.

10 Claims, 7 Drawing Sheets

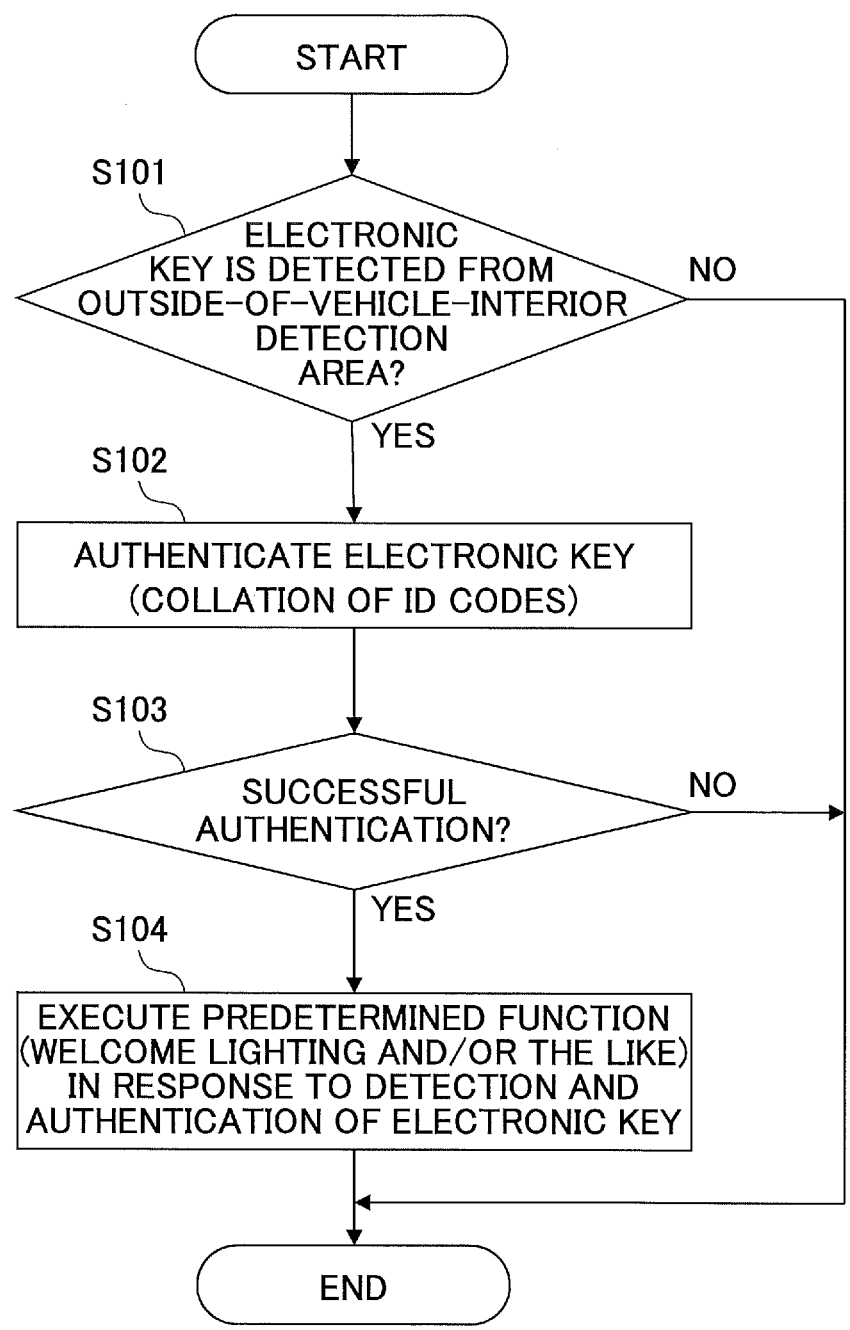

ELECTRONIC KEY SYSTEM

BACKGROUND OF THE INVENTION

1. Field of the Invention

The present invention relates to an electronic key system.

2. Description of the Related Art

Concerning the related art, a technique has been disclosed where in a vehicle mounting a so-called "smart entry system", a transmission interval and/or a transmission area are/is changed depending on the situation in order to reduce power consumption by a polling signal that is periodically transmitted (for example, see Japanese Laid-Open Patent Application No. 2012-026141 (Patent Reference No. 1)).

SUMMARY OF THE INVENTION

According to an aspect of the present invention, an electronic key system includes a transmission part configured to wirelessly transmit a polling signal at predetermined time intervals into a predetermined transmission area outside a vehicle interior; a detection part configured to detect an electronic key by receiving a response signal transmitted from the electronic key that is in the transmission area in response to the polling signal; and an execution part configured to cause a predetermined function of an on-vehicle apparatus to be executed when the electronic key is detected by the detection part. The transmission part is configured to transmit the polling signal into an enlarged transmission area which is enlarged from the predetermined transmission area when a state where the electronic key is detected by the detection part and a state where the electronic key is not detected by the detection part are repeated a predetermined number of times or more within a predetermined time, and the execution part is configured not to cause the predetermined function to be executed when the electronic key is detected from the enlarged transmission area by the detection part.

Other objects, features and advantages of the present invention will become more apparent from the following detailed description when read in conjunction with the accompanying drawings.

BRIEF DESCRIPTION OF THE DRAWINGS

FIG. 2 is a flowchart illustrating one example of a "smart entry control" process carried out by the electronic key system (a smart entry ECU);

DETAILED DESCRIPTION OF THE EMBODIMENT

Below, using the accompanying drawings, the embodiment of the present invention will be described.

Concerning the technique in the related art described above, power consumption in such a smart entry system is not limited to one due to a polling signal. Therefore, there may be a case where it may be impossible to effectively reduce power consumption by changing a transmission interval and/or a transmission area of the polling signal as mentioned above.

For example, when a user stands chatting or has a rest around a vehicle, the user may have an electronic key near the boundary of an outside-of-vehicle-interior detection area formed by a polling signal. If so, establishment and non-establishment of communication between the electronic key and the vehicle may be alternately repeated, due to the intensity of the polling signal, a variation of the reception sensitivity of the electronic key and/or the like. In such a case, a function to be executed upon establishment of communication between the electronic key and the vehicle (for example, turning on of lighting in the vehicle interior, an unlock permission (starting up of a smart lock sensor) or the like) is started up every time of communication establishment. As a result, power consumption may be increased due to the function.

The embodiment of the present invention has been devised in consideration of such a point, and an object of the embodiment is to provide an electronic key system by which it is possible to reduce power consumption in a case where an electronic key is continuously present near the boundary of an outside-of-vehicle-interior detection area that is formed for communication between the electronic key and the vehicle.

Below, the embodiment of the present invention will be described using the drawings.

The embodiment relates to an electronic key system by which a polling signal is wirelessly transmitted into a predetermined transmission area outside a vehicle interior (i.e., an outside-of-vehicle-interior detection area), authentication (detection) of an electronic key is carried out in response to a response signal transmitted by the electronic key that receives the polling signal, and a predetermined function is executed.

Figure 1:
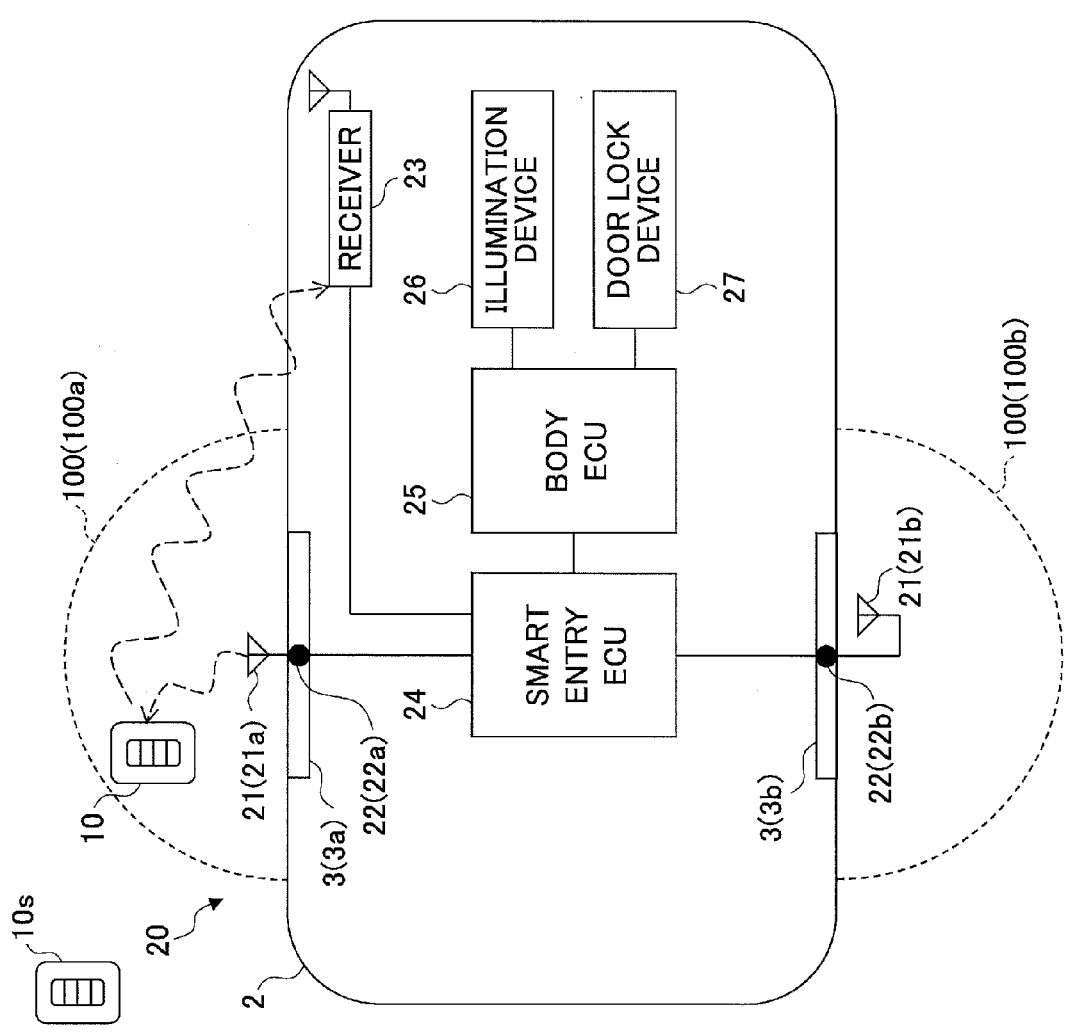
FIG. 1 is a block diagram illustrating one example of a configuration of an electronic key system.

FIG. 1 is a block diagram illustrating one example of a configuration of an electronic key system 1 according to the present embodiment. The electronic key system 1 includes an electronic key 10 and a vehicle-side control apparatus 20 installed in a vehicle 2.

The electronic key system 1 can carry out so-called smart entry control, i.e., the electronic key system 1 can cause a predetermined function of an on-vehicle apparatus, based on an authentication result (i.e., a result of collation of ID codes, or so) for the electronic key 10 through bidirectional communication between the electronic key 10 and the vehicle-side control apparatus 20. For example, when the electronic key 10 is authenticated (detected) in a state where the vehicle 2 is in an ignition turned off (IG-OFF) state and also all the doors of the vehicle 2 are in their locked states, vehicle interior lighting and/or a foot light installed at the base of a door mirror outside the vehicle interior are/is turned on. Alternatively or in addition, at a time of the vehicle 2 being in an IG-OFF state, depending on the authentication result for the electronic key 10, a smart lock system (not shown) by which locking/unlocking of the vehicle 2 is carried out by a predetermined operation performed by a user can be caused to enter a standby state. Specifically, a smart lock sensor (not shown) can be started up and the vehicle 2 can enter a state where it is possible to unlock the vehicle 2 by an operation input performed onto the smart lock sensor. Details thereof will be described later.

The electronic key 10 is a portable authentication terminal having a wireless communication function. The electronic key 10 transmits its unique ID code stored inside the vehicle-side control apparatus 20 (i.e., a receiver 23 described later). Then, a smart entry ECU 24 described later carries out collation of ID codes. Upon successive authentication due to the collation of ID codes, it is determined that the thus authenticated electronic key 10 is detected, and the smart entry ECU 24 carries out smart entry control corresponding to this electronic key 10.

The electronic key 10 is configured to be able to receive a polling signal transmitted by the smart entry ECU 24 via outside-of-vehicle-interior transmitter 22 (22a or 22b) installed in each of the doors (doors 3a and 3b) of the vehicle 2. Further, the electronic key 10 transmits a response signal corresponding to the polling signal to the receiver 23. Note that the response signal includes information concerning the unique ID code stored inside the electronic key 10.

Note that, according to FIG. 1, the doors 3 are installed at only two places on the two sides of the vehicle 2. However, the doors 3a and 3b illustrate the doors installed at the vehicle 2, and the number of the doors and configurations of the doors installed at the vehicle 2 can be any number and any configurations. Further, doors other than the doors 3a and 3b that can be installed at the vehicle 2 can have outside-of-vehicle-interior transmitters 22 connected with the smart entry ECU 24. Below, a description will be made assuming that the outside-of-vehicle-interior transmitters 22 are installed only corresponding to the doors 3a and 3b.

The vehicle-side control apparatus 20 includes, as communication devices for communication with the electronic key 10, outside-of-vehicle-interior antennas 21 (21a and 21b), the outside-of-vehicle-interior transmitters 22 (22a and 22b), the receiver 23, and so forth. Further, the vehicle-side control apparatus 20 includes, as control devices, the smart entry ECU 24, a body ECU 25, an illumination device 26, a door lock device 27, and so forth.

The outside-of-vehicle-interior antennas 21a and 21b corresponding to the outside-of-vehicle-interior transmitters 22a and 22b, respectively, are installed in door handles or so of the doors 3a and 3b and transmit the polling signals and so forth transmitted by the smart entry ECU 24 as electric waves (polling electric waves). Thus, the outside-of-vehicle-interior antennas 21a and 21b are electric wave transmission devices.

The outside-of-vehicle-interior transmitters 22a and 22b are installed corresponding to the doors 3a and 3b, respectively, and transmit the polling signals and so forth transmitted by the smart entry ECU 24 via the outside-of-vehicle-interior antennas 21a and 21b as electric waves. The reach distance of the polling signal transmitted from each of the outside-of-vehicle-interior transmitters 22a and 22b is, normally, on the order of about 1.0 m. The area where the transmitted polling signal reaches forms a detection area for the electronic key 10, that is, an outside-of-vehicle-interior detection area 100 (100a or 100b) for collation of ID codes through bidirectional communication between the electronic key 10 and the vehicle-side control apparatus 20. The outside-of-vehicle-interior transmitters 22a and 22b can be connected with the smart entry ECU 24 by an on-vehicle network such as a Local Interconnect Network (LIN) in such a manner that they can carry out communication therebetween.

The receiver 23 is an electric wave reception device receiving the response signal transmitted from the electronic key 10, or so. The receiver 23 is connected with the smart entry ECU 24 by, for example, an on-vehicle network such as a LIN in such a manner that they can carry out communication therebetween, and transmits the received response signal or so to the smart entry ECU 24.

The smart entry ECU 24 is a main control device in the electronic key system 1 which carries out control of authentication (collation of ID code) of the electronic key 10 through bidirectional communication between the electronic key 10 and the vehicle-side control apparatus 20 and smart entry control based on the authentication (collation) result. Specifically, the smart entry ECU 24 generates the polling signals at predetermined intervals (regular time intervals) when the vehicle 2 is in an IG-OFF state, and wirelessly transmits the polling signals to the outside of the vehicle interior via the outside-of-vehicle-interior transmitter 22a and 22b. Thereby, the smart entry ECU 24 forms outside-of-vehicle-interior detection areas 100a and 100b for the electronic key 10. That is, the smart entry ECU 24 transmits the polling signals into the outside-of-vehicle-interior detection areas 100a and 100b via the outside-of-vehicle-interior transmitters 22a and 22b. Further, the smart entry ECU 24 carries out authentication (collation of ID codes or so) for the electronic key 10 based on the response signal transmitted by the electronic key 10 and received by the receiver 23. The smart entry ECU 24 thus detects the electronic key 10 from the outside-of-vehicle-interior detection area through authentication of the electronic key 10 as a result of the collation. That is, the smart entry ECU 24 detects the user who possesses the electronic key 10 from the outside-of-vehicle-interior detection area. Further, when thus authenticating the electronic key 10 (i.e., detecting the electronic key 10 from the outside-of-vehicle-interior detection area 100a or 100b), the smart entry ECU 24 causes the on-vehicle apparatus to causes the predetermined function to be executed by the body ECU 25 or so. For example, the smart entry ECU 24 transmits a lighting request signal to the body ECU 25 that carries out driving control of the illumination device 26. In response to the lighting request signal, the body ECU 25 causes a predetermined function of the illumination device 26 (i.e., a function of turning on the lighting in the vehicle interior, the foot light at the base of the door mirror, and/or the like (i.e., a welcome lighting function)) to be executed. Further, the smart entry ECU 24 outputs a start-up signal(s) to the smart lock sensor(s) installed in the handle(s) or so of a predetermined door(s) (for example, the doors 3a and 3b) for causing a standby function (i.e., a smart unlock standby function) of unlocking all the doors (including the doors 3a and 3b) in response to a predetermined operation being performed on the smart lock system (not shown) to be executed. Thereafter, when a predetermined operation (a touch operation or so) by the user is detected by the smart lock sensor (not shown), the smart entry ECU 24 transmits an unlock signal to the body ECU 25. The body ECU 25 responds to the unlock signal to drive the door lock device 27 (a door lock motor(s) or so), which then unlocks all the doors of the vehicle 2. The smart entry ECU 24 is connected with the outside-of-vehicle-interior transmitters 22a and 22b, the receiver 23, the body ECU 25, and so forth, via, for example, the on-vehicle network such as a Controller Area Network (CAN) or a LIN in such a manner that the smart entry ECU 24 can carry out communication therewith.

Note that it is possible that the smart entry ECU 24 transmits the polling signals including identification codes unique to the respective outside-of-vehicle-interior transmitters 22a and 22b via the outside-of-vehicle-interior transmitters 22a and 22b. Then, it is possible that the electronic key 10 transmits the response signal including the identification code corresponding to the polling signal. Further, it is possible that the smart entry ECU 24 transmits the poling signals to the respective outside-of-vehicle-interior transmitters 22a and 22b, in sequence, with a time difference inserted therebetween. Thereby, the smart entry ECU 24 can determine which one of the outside-of-vehicle-interior transmitters 22a and 22b transmits the polling signal, the electronic key 10 responding thereto and transmitting the response signal. That is, the smart entry ECU 24 can determine which one of the doors 3a and 3b has (the user who has) the electronic key 10 near.

One example of a smart entry control process by the smart entry ECU 24 will now be described.

FIG. 2 is a flowchart illustrating one example of a smart entry control process carried out by the electronic key system 1 (the smart entry ECU 24). This process is carried out every predetermined period of time when the vehicle 2 is in an IG-OFF state and all the doors of the vehicle 2 are in their locked states.

As shown in FIG. 2, in Step S101, the smart entry ECU 24 determines whether it receives the response signal transmitted by the electronic key 10 in response to the polling signal that forms the outside-of-vehicle-interior detection area 100a or 100b. When the smart entry ECU 24 receives the response signal ("YES"), it proceeds to Step S102. When the smart entry ECU 24 does not receive the response signal ("NO"), it finishes the current process.

In Step S102, the smart entry ECU 24 carries out authentication of the electronic key 10. Specifically, it is possible that the smart entry ECU 24 carries out authentication by determining whether the ID code unique to the electronic key 10 included in the response signal is coincident with an ID code previously registered in the smart entry ECU 24 (i.e., collation of the ID codes).

In Step S103, the smart entry ECU 24 determines whether the electronic key 10 has been authenticated. When the electronic key 10 has been authenticated ("YES", i.e., the successful authentication has resulted), it proceeds to Step S104. When the electronic key 10 has not been authenticated ("NO", i.e., the authentication has been failed in), the smart entry ECU 24 finishes the current process.

In Step S104, in response to the authentication (detection) of the electronic key 10, the smart entry ECU 24 causes the smart unlock standby function and/or the welcome lighting function by the illumination device 26 to be executed, and finishes the current process. Specifically, as described above, the smart entry ECU 24 starts up the smart lock sensor and/or drives the illumination device 26 via the body ECU 25.

Note that it is possible that the smart entry ECU 24 carries out starting up or stopping of the smart lock sensor by controlling a relay connecting between the smart lock sensor and a battery (not shown).

Thus, the welcome lighting function of turning on the vehicle interior lighting and/or the foot light is executed in response to a detection of the electronic key 10 the user possesses. Therefore, when the user enters the vehicle at night, an area around the feet or the vehicle interior is lit, and thus, it is a user-friendly function. Further, the smart unlock standby function is executed (i.e., the smart lock sensor is started up) in response to a detection of the electronic key 10 the user possesses. Therefore, the doors can be smoothly unlocked.

Returning to FIG. 1, the body ECU 25 is a control device that drives and controls the illumination device 26 and the door lock device 27 (for locking/unlocking the doors of the vehicle 2 and so forth). Specifically, the body ECU 25 drives and controls a relay installed between the illumination device 26 and the battery (not shown), or so, and turns on or off various lights included in the illumination device 26. Further, the body ECU 25 drives and controls a door lock actuator (the door lock motor or so) and locks or unlocks the doors including the doors 3a and 3b of the vehicle 2.

Note that it is possible that the smart entry ECU 24 and the body ECU 25 are configured by a microcomputer(s) and carry out various control processes described above by executing a program(s) stored by a ROM in a CPU. Further, it is possible that the functions of the smart entry ECU 24 and the body ECU 25 are implemented by any type of hardware, software or firmware, or any combinations thereof. Further, it is possible that some or all of the functions of the smart entry ECU 24 and the body ECU 25 are implemented by another ECU(s). Further, it is possible that the smart entry ECU 24 and the body ECU 25 implement some or all of the functions of another ECU(s). For example, it is possible that some or all of the functions of the body ECU 25 are implemented by the smart entry ECU 24. Also, it is possible that some or all of the functions of the smart entry ECU 24 are implemented by the body ECU 25.

The illumination device 26 includes various lights such as the vehicle interior lighting, the foot lights installed at the bases of the door mirrors outside the vehicle interior of the vehicle 2, and so forth. It is possible that the lights included in the illumination device 26 are connected with the battery via relays, respectively, and turning on and off thereof is carried out as a result of the relays being controlled by the body ECU 25.

The door lock device 27 is a door lock/unlock device including a locking mechanism for locking and unlocking the doors including the doors 3a and 3b of the vehicle 2. It is possible that the door lock device 27 includes the door lock motor installed in each of the doors of the vehicle 2.

The electronic key system 1 further includes, in addition to the electronic key 10, a spare electronic key 10s as an authentication terminal for which authentication (detection) by the smart entry ECU 24 is possible. The spare electronic key 10s is, the same as the electronic key 10, a portable authentication terminal having a wireless communication function. Since the spare electronic key 10s has the same functions as the electronic key 10, detailed description thereof will be omitted. However, the electronic key 10 and the spare electronic key 10s are authenticated (detected) by the smart entry ECU 24 as the different authentication terminals. For example, the electronic key 10 and the spare electronic key 10s have different ID codes. Thereby, the smart entry ECU 24 is capable of determining which one of the electronic key 10 and the spare electronic key 10s for which authentication is possible is detected from the outside-of-vehicle-interior detection area 100a or 100b.

Note that it is possible that the smart entry ECU 24 transmits, via the outside-of-vehicle-interior transmitters 22a and 22b, the polling signal for the electronic key 10 and the polling signal for the spare electronic key 10s separately with a time difference inserted therebetween. That is, it is possible that the smart entry ECU 24 generates the polling signal for every authentication terminal to detect, provides a time difference thereamong, and detects a specific authentication terminal by using the outside-of-vehicle-interior detection area 100 (100*a* or 100*b*) formed for every authentication terminal. For example, when the authentication terminal used at a previous time of an operation of the vehicle 2 (at a previous time of IG-ON) is the spare electronic key 10*s*, it is possible that the smart entry ECU 24 transmits the polling signal for the spare electronic key 10*s* more preferentially (before) into the outside-of-vehicle-interior detection area 100. Further, it is possible that the smart entry ECU 24 records the authentication terminal used at a time of an operation of the vehicle 2 (at a time of IG-ON) and, based on the records, transmits the polling signal for the frequently used authentication terminal more preferentially into the outside-of-vehicle-interior detection area 100. Thereby, it is possible to promptly detect the authentication terminal from the outside-of-vehicle-interior detection area 100 according to the used states of the authentication terminals (the electronic key 10 and the spare electronic key 10*s*) in the past.

Next, a characteristic process by the electronic key system 1 (the smart entry ECU 24), that is, a process for when a state where the smart entry ECU 24 detects the electronic key 10 (a detected state) and a state where the smart entry ECU 24 does not detect the electronic key 10 (a non-detected state) are alternately repeated will be described.

First, a situation where a state where the smart entry ECU 24 detects the electronic key 10 (a detected state) and a state where the smart entry ECU 24 does not detect the electronic key 10 (a non-detected state) are alternately repeated will be described.

Figure 3A:
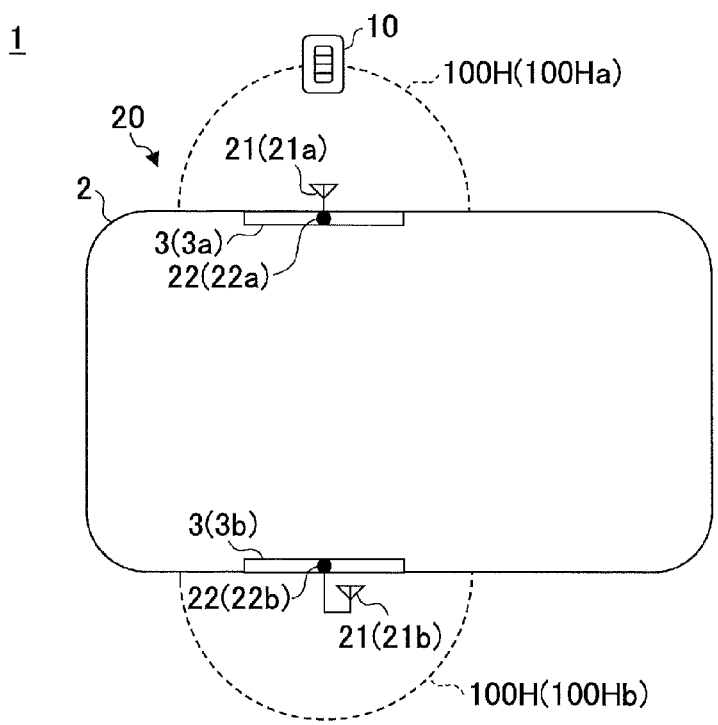
FIGS. 3A and 3B illustrate one example where a state where an electronic key is detected by the electronic key system (the smart entry ECU) (a detected state) and a state where the electronic key is not detected by the electronic key system (the smart entry ECU) (a non-detected state) are alternately repeated.
Figure 3B:
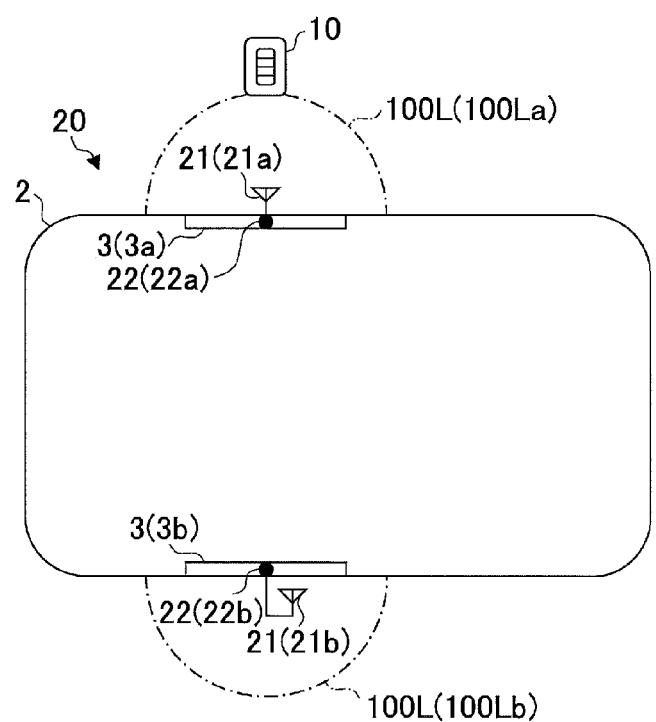

FIGS. 3A and 3B illustrate one example where a state where an electronic key is detected by the electronic key system 1 (the smart entry ECU 24) (a detected state) and a state where the electronic key is not detected by the electronic key system 1 (the smart entry ECU 24) (a non-detected state) are alternately repeated. Each of FIGS. 3A and 3B illustrates a case where the electronic key 10 is present near the boundary of the outside-of-vehicle-interior detection area 100*a*. FIG. 3A illustrates a state where, depending on variations of the output intensities of the outside-of-vehicle-interior transmitters 22*a* and 22*b*, the reception sensitivity of the electronic key 10 and/or the like, outside-of-vehicle-interior detection areas 100H (100Ha and 100Hb) as the upper limits of the outside-of-vehicle-interior detection areas 100*a* and 100*b* are formed. FIG. 3B illustrates a state where, depending on variations of the output intensities of the outside-of-vehicle-interior transmitters 22*a* and 22*b*, the reception sensitivity of the electronic key 10 and/or the like, outside-of-vehicle-interior detection areas 100L (100La and 100Lb) as the lower limits of the outside-of-vehicle-interior detection areas 100*a* and 100*b* are formed. That is, the outside-of-vehicle-interior detection areas 100H represent the maximum areas formed as the outside-of-vehicle-interior detection areas 100 depending on variations of the output intensities of the outside-of-vehicle-interior transmitters 22*a* and 22*b*, the reception sensitivity of the electronic key 10 and/or the like. The outside-of-vehicle-interior detection areas 100L represent the minimum areas formed as the outside-of-vehicle-interior detection areas 100 depending on variations of the output intensities of the outside-of-vehicle-interior transmitters 22*a* and 22*b*, the reception sensitivity of the electronic key 10 and/or the like. Note that the vehicle 2 is in an IG-OFF state, and also, all the doors (including the doors 3*a* and 3*b*) of the vehicle 2 are in their locked states.

As shown in FIG. 3A, the electronic key 10 is included in the outside-of-vehicle-interior detection area 100Ha formed as the upper limit of the variations. Therefore, it is authenticated (detected) (a detected state) through bidirectional communication with the vehicle-side control apparatus 20 (the smart entry ECU 24).

In contrast thereto, as shown in FIG. 3B, the electronic key 10 is not included in the outside-of-vehicle-interior detection area 100La formed as the lower limit of the variations. Therefore, it is not authenticated (not detected) (a non-detected state) because bidirectional communication with the vehicle-side control apparatus 20 is not established.

Thus, depending on variations of the output intensities of the outside-of-vehicle-interior transmitters 22*a* and 22*b*, the reception sensitivity of the electronic key 10 and/or the like, the ranges of the outside-of-vehicle-interior detection areas 100 formed by the polling electric waves transmitted by the outside-of-vehicle-interior transmitters 22*a* and 22*b* change (i.e., the polling signal reach ranges change). Therefore, when the electronic key 10 is present near the boundary of the outside-of-vehicle-interior detection area 100 as in this example, a state where the electronic key 10 is detected by the smart entry ECU 24 and a state where the electronic key 10 is not detected by the smart entry ECU 24 may be alternately repeated depending on such changes of (the range of) the outside-of-vehicle-interior detection area 100.

Next, specifically, a characteristic process by the electronic key system (i.e., a process for when a detected state and a non-detected state of the electronic key are alternately repeated) will be described using FIG. 4.

Figure 4:
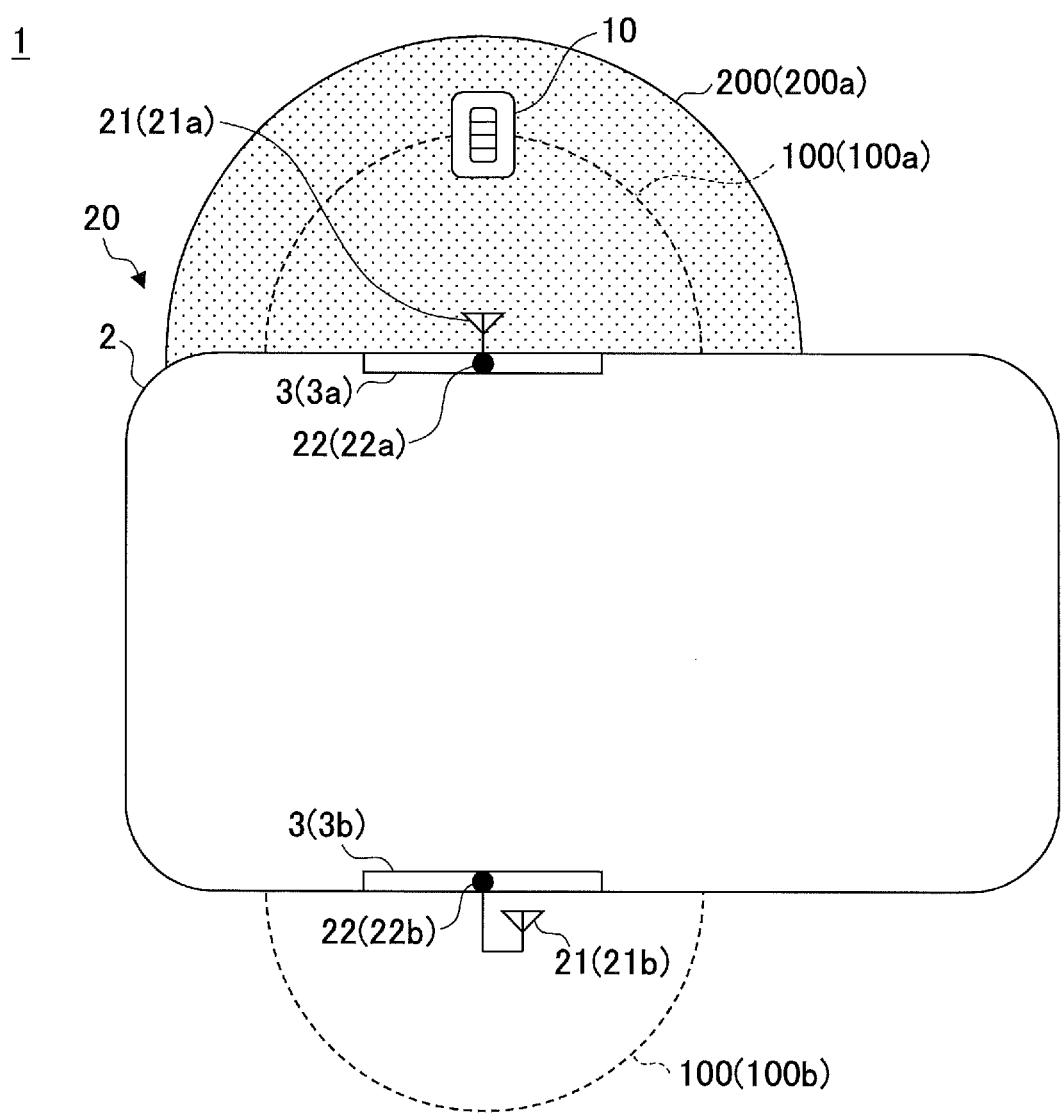
FIG. 4 illustrates one example of a characteristic process by the electronic key system (the smart entry ECU) (i.e., a process for when a state where the electronic key is detected (a detected state) and a state where the electronic key is not detected (a non-detected state) are alternately repeated)

FIG. 4 illustrates one example of a characteristic process by the electronic key system 1 (the smart entry ECU 24) (i.e., a process for when a state where the electronic key is detected and a state where the electronic key is not detected are alternately repeated). Note that, in the same way as FIGS. 3A and 3B, the electronic key 10 is present near the boundary of the outside-of-vehicle-interior detection area 100*a*.

Specifically, when a detected state and a non-detected state of the electronic key 10 by the smart entry ECU 24 are alternately repeated in the outside-of-vehicle-interior detection area 100*a*, the smart entry ECU 24 forms an outside-of-vehicle-interior detection area 200 (200*a*) enlarged in its range from the outside-of-vehicle-interior detection area 100*a*, via the outside-of-vehicle-interior transmitter 22*a*. Then, the smart entry ECU 24 determines whether it is possible to detect the electronic key 10 from the enlarged outside-of-vehicle-interior detection area 200*a*. That is, the smart entry ECU 24 receives the response signal transmitted by the electronic key 10 in response to the polling signal from the outside-of-vehicle-interior transmitter 22*a* that forms the enlarged outside-of-vehicle-interior detection area 200*a* and determines whether it is possible to authenticate (detect) the electronic key 10.

As shown in FIG. 4, when the user carrying the electronic key 10 continuously stays near the boundary of the outside-of-vehicle-interior detection area 100*a*, the smart entry ECU 24 can detect the electronic key 10 from the enlarged outside-of-vehicle-interior detection area 200*a*. That is, it is possible to determine whether there is a high probability that the electronic key 10 continuously stays near the boundary of the outside-of-vehicle-interior detection area 100*a*, by determining whether the electronic key 10 is detected from the outside-of-vehicle-interior detection area 200 (200*a* or 200*b*) enlarged in its range from the outside-of-vehicle-interior detection area 100 (100*a* or 100*b*) where the detected state and the non-detected state of the electronic key 10 were alternately repeated.

Note that the range enlarging amount from the outside-of-vehicle-interior detection area 100*a* to the outside-of-vehicle-interior detection area 200*a* is set to be greater than the variation amount of the outside-of-vehicle-interior detection area 100a (i.e., the difference between the outside-of-vehicle-interior detection areas 100Ha and 100La). For example, when the variation amount of the outside-of-vehicle-interior detection area 100a is, for example, less than 1 dB in system sensitivity, the outside-of-vehicle-interior detection area 200a can be set to be higher in system sensitivity than the outside-of-vehicle-interior detection area 100a by 3 dB.

When the smart entry ECU 24 detects the electronic key 10 from the enlarged outside-of-vehicle-interior detection area 200a, the smart entry ECU 24 does not cause the above-described predetermined function of the on-vehicle apparatus (the welcome lighting function and/or the smart unlock standby function) regarding the electronic key 10 to be executed. Thus, the predetermined function of the on-vehicle apparatus is not executed in a situation where the user does not require the predetermined function of the on-vehicle apparatus, such as a situation where the electronic key 10 stays near the boundary of the outside-of-vehicle-interior detection area 100a, or so. As a result, it is possible to avoid power consumption otherwise occurring for causing the predetermined function to be executed. Hereinafter, such control of not causing the predetermined function to be executed even when the electronic key 10 is detected may be referred to as "power saving control".

Note that, in this example, the case where the electronic key 10 continuously stays near the boundary of the outside-of-vehicle-interior detection area 100a has been described. However, the same operations are carried out also in the case where the electronic key 10 continuously stays near the boundary of the outside-of-vehicle-interior detection area 100b. That is, when a detected state and a non-detected state of the electronic key 10 are alternately repeated in the outside-of-vehicle-interior detection area 100b, the smart entry ECU 24 determines whether the electronic key 10 is detected from the outside-of-vehicle-interior detection area 200b enlarged from the outside-of-vehicle-interior detection area 100b. When the electronic key 10 is detected from the outside-of-vehicle-interior detection area 200b enlarged in its range from the outside-of-vehicle-interior detection area 100b, the smart entry ECU 24 does not cause the predetermined function of the on-vehicle apparatus to be executed.

Figure 5:
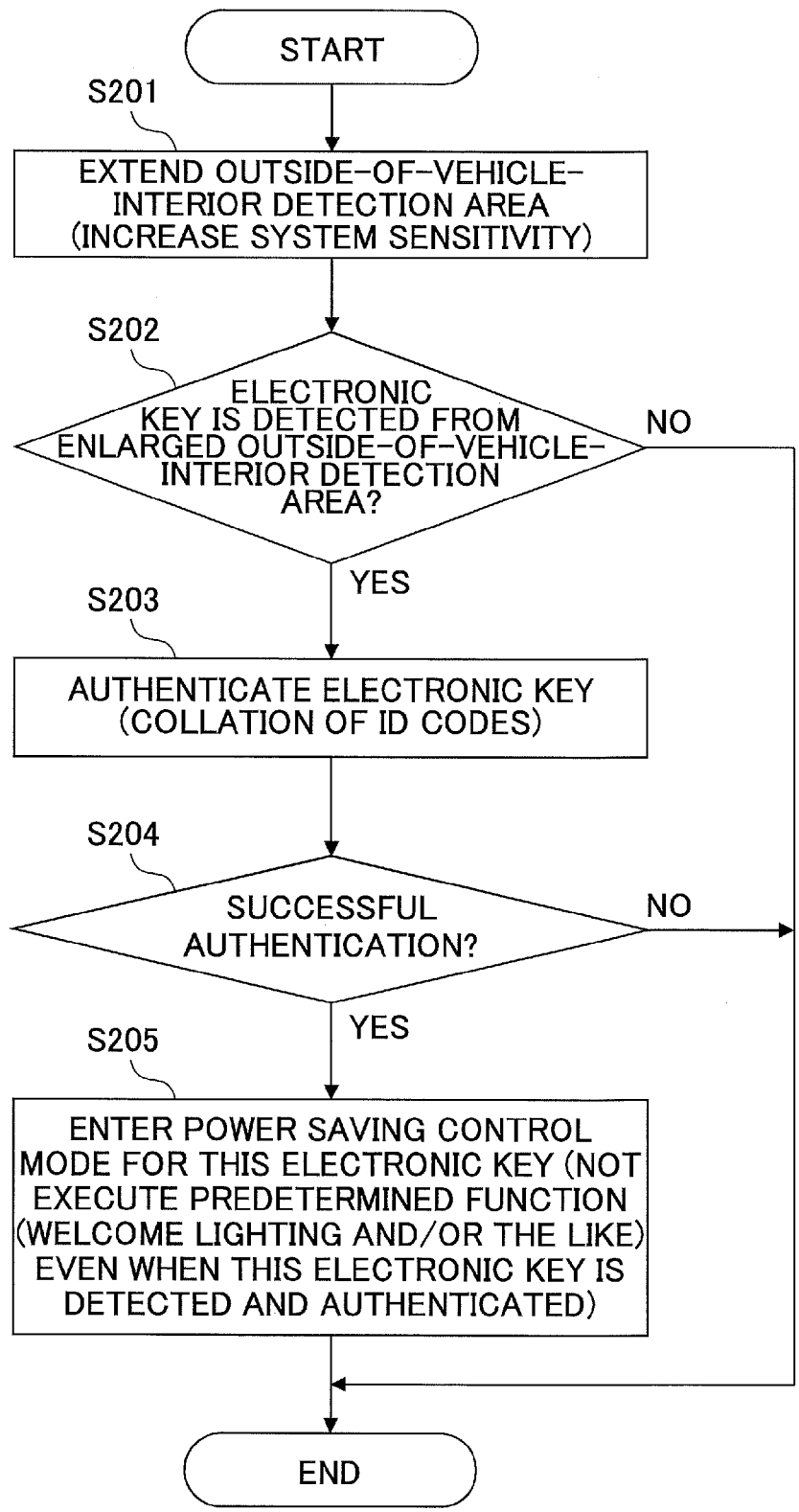
FIG. 5 is a flowchart illustrating one example of a characteristic process by the electronic key system (the smart entry ECU) (i.e., a process for when a state where the electronic key is detected (a detected state) and a state where the electronic key is not detected (a non-detected state) are alternately repeated)

FIG. 5 is a flowchart illustrating one example of a characteristic process by the electronic key system 1 (the smart entry ECU 24) (i.e., a process for when a state where the electronic key 10 is detected (a detected state) and a state where the electronic key 10 is not detected (a non-detected state) are alternately repeated). This flow is executed when a detected state and a non-detected state of the electronic key 10 are alternately repeated a predetermined number of times (for example, three times, i.e., the three times of the detected states and the three times of the non-detected states in total) or more within a predetermined time (for example, 5 minutes) in a state where the vehicle 2 is in an IG-OFF state and also all the doors of the vehicle 2 (including the doors 3a and 3b) are in their locked states.

As shown in FIG. 5, in Step S201, the smart entry ECU 24 enlarges the outside-of-vehicle-interior detection area 100 (one of the outside-of-vehicle-interior detection areas 100a and 100b where the detected state and the non-detected state of the electronic key 10 were alternately repeated). That is, the smart entry ECU 24 forms the outside-of-vehicle-interior detection area 200 (either one of the outside-of-vehicle-interior detection areas 200a and 200b), via the outside-of-vehicle-interior transmitter 22 (either one of 22a and 22b) forming the outside-of-vehicle-interior detection area 100 where the detected state and the non-detected state of the electronic key 10 were alternately repeated.

Note that such enlargement of the outside-of-vehicle-interior detection area 100 (100a or 100b) can be implemented by changing (increasing) the output of the outside-of-vehicle-interior transmitter 22 (22a or 22b) or by changing (increasing) the polling signal reception sensitivity of the electronic key 10.

Next, in Step S202, the smart entry ECU 24 determines whether it receives the response signal transmitted by the electronic key 10 in response to the polling signal that forms the enlarged outside-of-vehicle-interior detection area 200 (200a or 200b) corresponding to the outside-of-vehicle-interior detection area 100 where the detected state and the non-detected state of the electronic key 10 were alternately repeated. When the smart entry ECU 24 receives the response signal ("YES"), it proceeds to Step S203. When the smart entry ECU 24 does not receive the response signal ("NO"), it finishes the current process.

In Step S203, the smart entry ECU 24 carries out authentication of the electronic key 10. Specifically, it is possible that the smart entry ECU 24 carries out authentication of the electronic key 10 by determining whether the ID code unique to the electronic key 10 included in the received response signal is coincident with the ID code previously registered in the smart entry ECU 24 (collation of ID codes).

In Step S204, the smart entry ECU 24 determines whether the electronic key 10 is authenticated. When the electronic key 10 is authenticated ("YES", i.e., the successful authentication has resulted), the smart entry ECU 24 proceeds to Step S205. When the electronic key 10 is not authenticated ("NO", i.e., the authentication has been failed in), the smart entry ECU 24 finishes the current process.

In Step S205, in response to the authentication (detection) of the electronic key 10, the smart entry ECU 24 starts power saving control regarding the electronic key 10 and finishes the current process. That is, even when the electronic key 10 is detected, the smart entry ECU 24 does not cause the smart unlock standby function and/or the welcome lighting function by the illumination device 26 to be executed.

Note that, since the smart entry ECU 24 does not cause the above-described predetermined function of the on-vehicle apparatus to be executed in response to the detection of the electronic key 10, the smart entry ECU 24 does not output information indicating that the electronic key 10 is authenticated (detected) to the on-vehicle network (CAN or so).

Thus, when a detected state and a non-detected state of the electronic key 10 are alternately repeated in the outside-of-vehicle-interior detection area 100, the smart entry ECU 24 forms the outside-of-vehicle-interior detection area 200 enlarged from the outside-of-vehicle-interior detection area 100, and determines whether the electronic key 10 is detected from the outside-of-vehicle-interior detection area 200. Thereby, the smart entry ECU 24 can determine whether there is a high probability that the electronic key 10 is continuously present (stays) near the boundary of the outside-of-vehicle-interior detection area 100. That is, the smart entry ECU 24 can determine that there is a high probability that the electronic key 10 is continuously present near the boundary of the outside-of-vehicle-interior detection area 100 when the electronic key 10 is detected from the outside-of-vehicle-interior detection area 200.

Further, when the electronic key 10 is detected from the outside-of-vehicle-interior detection area 200, the smart entry ECU 24 starts power saving control regarding the electronic key 10. Specifically, even when the smart entry ECU 24 detects the electronic key 10, it does not cause the predetermined function of the on-vehicle apparatus (the welcome lighting function, the smart unlock standby function and/or the like) to be executed. Thereby, it is possible to avoid power consumption otherwise occurring by causing the predetermined function of the on-vehicle apparatus to be executed. In this case, the electronic key 10 is continuously present near the boundary of the outside-of-vehicle-interior detection area 100, and therefore, the predetermined function of the on-vehicle apparatus is not required (i.e., it is considered that the user carrying the electronic key 10 continuously stays near the vehicle 2 and does not intend to ride in the vehicle 2). Therefore, even though the predetermined function of the on-vehicle apparatus is not executed, no problem occurs. That is, the electronic key system 1 according to the present embodiment can reduce power consumption when the electronic key 10 is continuously present near the boundary of the outside-of-vehicle-interior detection area 100 formed for communication between the electronic key 10 and the vehicle 2.

Note that, as described above, even when the electronic key 10 is detected, the smart entry ECU 24 does not output information indicating that the electronic key 10 is authenticated (detected) to the on-vehicle network (CAN or so). Therefore, in an IG-OFF state of the vehicle 2, it is not necessary to wake up the on-vehicle network (CAN or so) that has been in its stopped state. Thus, it is also possible to avoid power consumption required for the waking up operation.

Next, a process of detecting the electronic key 10 and the spare electronic key 10s by the electronic key system 1 during power saving control regarding the electronic key 10 will be described.

Figure 6:
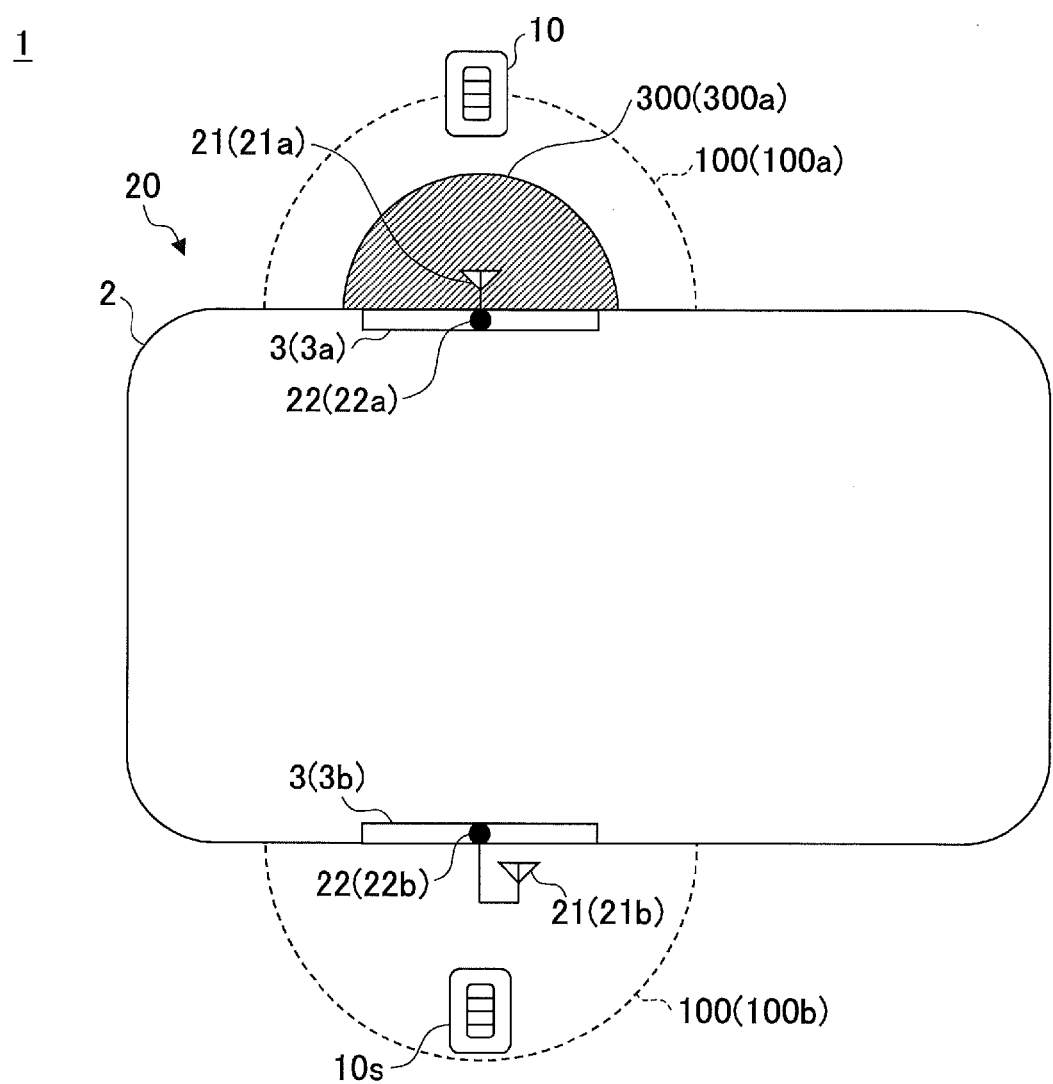
FIG. 6 illustrates one example of a process of detecting the electronic key and a spare electronic key by the electronic key system (the smart entry ECU) during power saving control regarding the electronic key.

FIG. 6 illustrates one example of a process of detecting the electronic key 10 and the spare electronic key 10s by the electronic key system 1 (the smart entry ECU 24) during power saving control regarding the electronic key 10. Specifically, FIG. 6 illustrates a state where the electronic key 10 is present near the boundary of the outside-of-vehicle-interior detection area 100a and the spare electronic key 10s (i.e., a user who carries it) enters the outside-of-vehicle-interior detection area 100b.

Even during power saving control regarding the electronic key 10, the outside-of-vehicle-interior detection areas 100 (100a and 100b) are basically formed for the purpose of detecting the electronic key 10 or the spare electronic key 10s. By using it, the smart entry ECU 24 carries out an operation of detecting the electronic key 10 and the spare electronic key 10s.

In this case, when the smart entry ECU 24 detects the electronic key 10 from the outside-of-vehicle-interior detection area 100a during power saving control regarding the electronic key 10, it does not cause the predetermined function of the on-vehicle apparatus (the welcome lighting function, the smart unlock standby function and/or the like) to be executed.

In addition, the smart entry ECU 24 forms an outside-of-vehicle-interior detection area 300 (300a) reduced in its range from the outside-of-vehicle-interior detection area 100a via the outside-of-vehicle-interior transmitter 22a. The smart entry ECU 24 then determines whether the electronic key 10 is detected from the outside-of-vehicle-interior detection area 300a.

When the electronic key 10 is not detected from the outside-of-vehicle-interior detection area 300a, it is possible to determine that the electronic key 10 still stays near the boundary of the outside-of-vehicle-interior detection area 100a. In contrast thereto, when the electronic key 10 is detected from the outside-of-vehicle-interior detection area 300a, it is possible to determine that the electronic key 10 (or the user who carries it) that stayed near the boundary of the outside-of-vehicle-interior detection area 100a is approaching the door 3a.

Note that the range reduction amount from the outside-of-vehicle-interior detection area 100a to the outside-of-vehicle-interior detection area 300a is set to be greater than the variation amount of the outside-of-vehicle-interior detection area 100a (i.e., the difference between the outside-of-vehicle-interior detection areas 100Ha and 100La). For example, when the variation amount of the outside-of-vehicle-interior detection area 100a is less than 1 dB in system sensitivity, the outside-of-vehicle-interior detection area 300a can be set to be lower in system sensitivity than the outside-of-vehicle-interior detection area 100a by 3 dB.

When the electronic key 10 (or the user who carries it) is approaching the door 3a, it is considered that there is a high probability that the user will ride in the vehicle 2. Therefore, when the electronic key 10 is detected from the outside-of-vehicle-interior detection area 300a, the smart entry ECU 24 shifts to normal control from the power saving control regarding the electronic key 10 and causes the predetermined function of the on-vehicle apparatus (the welcome lighting function, the smart unlock standby function and/or the like) to be executed in response to the detection of the electronic key 10. Thereby, it is possible to positively cause the predetermined function of the on-vehicle apparatus to be executed in the situation where the predetermined function of the on-vehicle apparatus is actually required only with a little delay occurring due to the electronic key 10 being detected from the reduced outside-of-vehicle-interior detection area 300a. That is, it is possible to minimize the influence of the power saving control for reducing the power consumption on the convenience of the user who uses the electronic key 10.

Note that, when the outside-of-vehicle-interior detection area 300a is set to be lower than the outside-of-vehicle-interior detection area 100a by 3 dB in system sensitivity, the delay occurring due to the electronic key 10 being detected from the outside-of-vehicle-interior detection area 300a is on the order of 10 ms in comparison to it being detected from the outside-of-vehicle-interior detection area 100a.

When the spare electronic key 10s is detected from the outside-of-vehicle-interior detection area 100b, the smart entry ECU 24 causes the predetermined function of the on-vehicle apparatus (the welcome lighting function, the smart unlock standby function and/or the like) to be executed according to the flowchart of FIG. 2 described above. Thereby, the user who carries the key (i.e., the spare electronic key 10s) other than the electronic key 10 for which power saving control is carried out and will ride in the vehicle 2 is not influenced by power saving control regarding the electronic key 10. That is, it is possible to achieve both the reduction in the power consumption for when the electronic key 10 is present near the boundary of the outside-of-vehicle-interior detection area 100 and the convenience of the user who uses the spare electronic key 10s.

Note that, in this example, the case where the electronic key 10 is continuously present near the boundary of the outside-of-vehicle-interior detection area 100a has been described. However, the same operations are carried out also in the case where the electronic key 10 is continuously present near the boundary of the outside-of-vehicle-interior detection area 100b. That is, the smart entry ECU 24 forms the outside-of-vehicle-interior detection area 300 (300b) reduced in its range from the outside-of-vehicle-interior detection area 100b, and determines whether the electronic key 10 is detected from the reduced outside-of-vehicle-interior detection area 300b. When the electronic key 10 is detected from the outside-of-vehicle-interior detection area 300b, the smart entry ECU 24 shifts to normal control from the power saving control regarding the electronic key 10 and causes the predetermined function of the on-vehicle apparatus to be executed.

Figure 7:
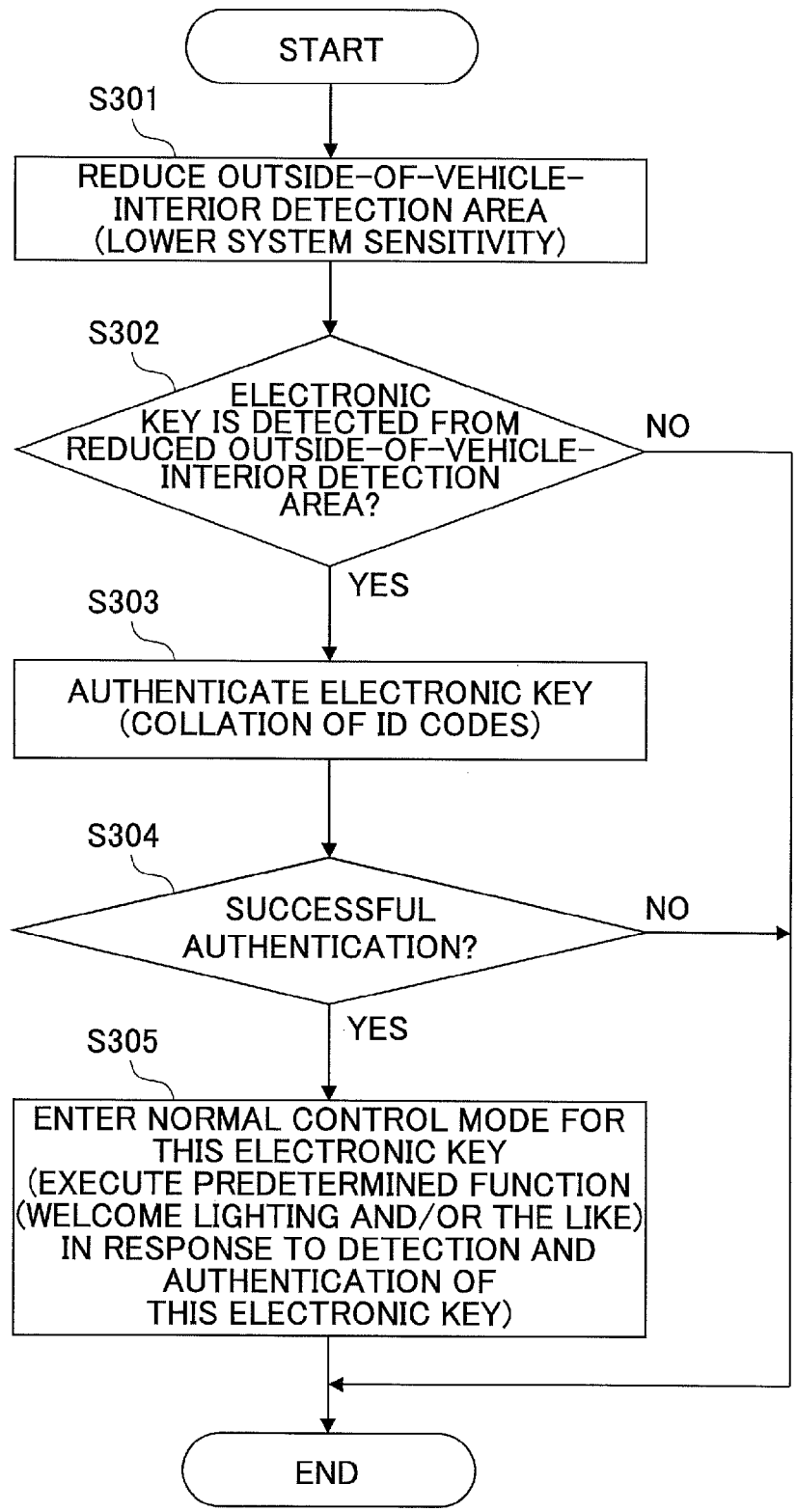
FIG. 7 is a flowchart illustrating one example of a process of detecting the electronic key and the spare electronic key by the electronic key system (the smart entry ECU) during power saving control regarding the electronic key.

FIG. 7 is a flowchart illustrating one example of a process of detecting the electronic key 10 and the spare electronic key 10s by the electronic key system 1 (the smart entry ECU 24) during power saving control regarding the electronic key 10. This flow is executed every time when the electronic key 10 is detected from the outside-of-vehicle-interior detection area 100 (either one of 100a and 100b) during power saving control regarding the electronic key 10.

As shown in FIG. 7, in Step S301, the smart entry ECU 24 reduces the outside-of-vehicle-interior detection area 100. That is, the smart entry ECU 24 forms the outside-of-vehicle-interior detection area 300 (either one of the outside-of-vehicle-interior detection areas 300a and 300b) via the outside-of-vehicle-interior transmitter 22 (either one of 22a and 22b) forming the outside-of-vehicle-interior detection area 100 where the electronic key 10 was detected.

Next, in Step S302, the smart entry ECU 24 determines whether it receives the response signal transmitted by the electronic key 10 in response to the polling signal that forms the reduced outside-of-vehicle-interior detection area 300 (300a or 300b). When the smart entry ECU 24 receives the response signal ("YES"), it proceeds to Step S303. When the smart entry ECU 24 does not receive the response signal ("NO"), it finishes the current process.

In Step S303, the smart entry ECU 24 carries out authentication of the electronic key 10. Specifically, it is possible that the smart entry ECU 24 carries out authentication of the electronic key 10 by determining whether the ID code unique to the electronic key 10 included in the response signal is coincident with the ID code previously registered in the smart entry ECU 24 (collation of ID codes).

In Step S304, the smart entry ECU 24 determines whether the electronic key 10 is authenticated. When the electronic key 10 is authenticated ("YES", i.e., the successful authentication has resulted), the smart entry ECU 24 proceeds to Step S305. When the electronic key 10 is not authenticated ("NO", i.e., the authentication has been failed in), the smart entry ECU 24 finishes the current process.

In Step S305, in response to the authentication (detection) of the electronic key 10, the smart entry ECU 24 shifts to normal control from the power saving control regarding the electronic key 10 and finishes the current process. That is, in response to the detection of the electronic key 10, the smart entry ECU 24 causes the smart unlock standby function and/or the welcome lighting function by the illumination device 26 to be executed.

On the other hand, a process of detecting the spare electronic key 10s by the smart entry ECU 24 during power saving control regarding the electronic key 10 is executed according to the flowchart of FIG. 2 described above.

Thus, during power saving control regarding the electronic key 10, the smart entry ECU 24 causes the predetermined function of the on-vehicle apparatus to be executed when the electronic key 10 is detected from the outside-of-vehicle-interior detection area 300 reduced in its range from the outside-of-vehicle-interior detection area 100. Thereby, it is possible to minimize the influence of power saving control for the reduction of the power consumption on the convenience of the user who uses the electronic key 10. That is, it is possible to reduce the power consumption for when the electronic key 10 is present near the boundary of the outside-of-vehicle-interior detection area 100 while almost keeping the user's convenience.

On the other hand, during power saving control regarding the electronic key 10, the smart entry ECU 24 causes the predetermined function of the on-vehicle apparatus to be executed when the spare electronic key 10s is detected from the normal outside-of-vehicle-interior detection area 100. Thereby, it is possible to achieve both the reduction in the power consumption for when the electronic key 10 is present near the boundary of the outside-of-vehicle-interior detection area 100 and the convenience of the user who uses the spare electronic key 10s.

Further, during power saving control regarding the electronic key 10, the smart entry ECU 24 carries out operations to detect the electronic key 10 and the spare electronic key 10s from the outside-of-vehicle-interior detection areas 100. Then, when the electronic key 10 is detected, the smart entry ECU 24 further determines whether the electronic key 10 is detected from the reduced outside-of-vehicle-interior detection area 300. Thereby, it is possible to detect the spare electronic key 10s more preferentially that is carried by a user and is likely to move from another place than the electronic key 10 that stays near the boundary of the outside-of-vehicle-interior detection area 100.

Note that, in the above-described example, during power saving control regarding the electronic key 10, the smart entry ECU 24 forms the outside-of-vehicle-interior detection area 300 reduced in range and again determines whether the electronic key 10 is detected therefrom, when the electronic key 10 is detected from the outside-of-vehicle-interior detection area 100. However, it is also possible that, during power saving control regarding the electronic key 10, the smart entry ECU 24 first determines whether the electronic key 10 is detected from the reduced outside-of-vehicle-interior detection area 300. That is, it is possible that the smart entry ECU 24 transmits the polling signal for the electronic key 10 and the polling signal for the spare electronic key 10s with a time difference inserted therebetween, into the reduced outside-of-vehicle-interior detection area 300 and the normal outside-of-vehicle-interior detection area 100, respectively. At this time, it is possible that the smart entry ECU 24 transmits the polling signal for the spare electronic key 10s more preferentially than (i.e., in prior to) the polling signal for the electronic key 10 via the outside-of-vehicle-interior transmitters 22a and 22b. Thereby, it is possible to detect the spare electronic key 10s more preferentially that is carried by a user and is likely to move from another place than the electronic key 10 that stays near the boundary of the outside-of-vehicle-interior detection area 100.

Further, in the above-described example, during power saving control regarding the electronic key 10, the smart entry ECU 24 determines whether the electronic key 10 is detected from the outside-of-vehicle-interior detection area 300, without exception, when the electronic key 10 is detected from the outside-of-vehicle-interior detection area 100 (either one of 100a and 100b) (see Step S301 of FIG. 7). However, it is also possible that the smart entry ECU 24 determines whether the electronic key 10 is detected from the outside-of-vehicle-interior detection area 300 further only when the electronic key 10 is detected from the outside-of-vehicle-interior detection area 100 (either one of 100a and 100b) where it was determined that the electronic key 10 was present near the boundary at the time of shifting to power saving control regarding the electronic key 10 (see FIG. 5). That is, it is possible that when the electronic key 10 is detected from an area other than the outside-of-vehicle-interior detection area 100 where it was determined that the electronic key 10 was present near the boundary at the time of shifting to the power saving control, the smart entry ECU 24 causes the predetermined function of the on-vehicle apparatus mentioned above to be executed.

Further, in the above-described example, a process of detecting the electronic key 10 and the spare electronic key 10s during power saving control regarding the electronic key 10 has been described. However, the same operations are carried out also in a process of detecting the electronic key 10 and the spare electronic key 10s during power saving control regarding the spare electronic key 10s. For example, when the spare electronic key 10s is present near the boundary of the outside-of-vehicle-interior detection area 100a, the smart entry ECU 24 forms the outside-of-vehicle-interior detection area 300a reduced from the outside-of-vehicle-interior detection area 100a in its range and determines whether the spare electronic key 10s is detected from the outside-of-vehicle-interior detection area 300a. When the spare electronic key 10s is then detected from the outside-of-vehicle-interior detection area 300, the smart entry ECU 24 causes the predetermined function of the on-vehicle apparatus described above to be executed.

Thus, the electronic key system has been described in the embodiment in detail. However, the present invention is not limited to the specific embodiment, and variations, modifications and/or replacements can be made on the embodiment without departing from the scope of the present invention.

For example, in the above-described embodiment, smart entry control (the predetermined function of the on-vehicle apparatus) is executed in response to the smart entry ECU 24 carrying out authentication (detection) on the two of the authentication terminals, i.e., the electronic key 10 and the spare electronic key 10s. However, it is also possible that smart entry control (the predetermined function of the on-vehicle apparatus) is executed in response to the smart entry ECU 24 carrying out authentication (detection) on three or more of such authentication terminals.

Thus, according to the present embodiment, it is possible to provide an electronic key system by which it is possible to reduce power consumption for when an electronic key is continuously present near the boundary of an outside-of-vehicle-interior detection area formed for carrying out communication between the electronic key and the vehicle.

The present application is based on and claims the benefit of priority of Japanese Priority Application No. 2014-070432, filed on Mar. 28, 2014, the entire contents of which are hereby incorporated herein by reference.

What is claimed is:

1. An electronic key system comprising:
a transmission part configured to wirelessly transmit a polling signal at predetermined time intervals into a predetermined transmission area outside a vehicle interior;
a detection part configured to detect an electronic key by receiving a response signal transmitted from the electronic key that is in the transmission area in response to the polling signal;
an authentication part configured to carry out collation between the detected electronic key and an ID code; and
an execution part configured to, when the electronic key is detected by the detection part, cause a predetermined function of an on-vehicle apparatus to be executed if the electronic key is authenticated by the authentication part, wherein
the transmission part is configured to transmit the polling signal into an enlarged transmission area which is enlarged from the predetermined transmission area when a state where the electronic key is detected by the detection part and a state where the electronic key is not detected by the detection part are repeated a predetermined number of times or more within a predetermined time, and
when the electronic key is detected from the enlarged transmission area by the detection part, the execution part is configured not to cause the predetermined function to be executed even if the electronic key is authenticated by the authentication part.

2. The electronic key system as claimed in claim 1, wherein
the transmission part is configured to transmit the polling signal into a reduced transmission area that is reduced from the predetermined transmission area after the electronic key is detected from the enlarged transmission area by the detection part, and
the execution part is configured to cause the predetermined function to be executed when the electronic key is detected from the reduced transmission area by the detection part.

3. The electronic key system as claimed in claim 2, wherein
the electronic key is either one electronic key or another electronic key, and
the execution part is configured to cause the predetermined function to be executed when the one electronic key is detected from the reduced transmission area by the detection part after the one electronic key is detected from the enlarged transmission area by the detection part, or when the other electronic key is detected from the predetermined transmission area.

4. The electronic key system as claimed in claim 3, wherein
the transmission part is configured to transmit the polling signal into the predetermined transmission area after the one electronic key is detected from the enlarged transmission area by the detection part, and transmit the polling signal for the one electronic key into the reduced transmission area when the one electronic key is detected from the predetermined transmission area by the detection part.

5. The electronic key system as claimed in claim 3, wherein
the transmission part is configured to be capable of separately transmitting the polling signals to the one electronic key and the other electronic key, respectively; wirelessly transmit the polling signal for the one electronic key and the polling signal for the other electronic key with a time difference inserted therebetween into the reduced transmission area and the predetermined transmission area, respectively, after the one electronic key is detected from the enlarged transmission area by the detection part; and transmit the polling signal for the other electronic key more preferentially than the polling signal for the one electronic key.

6. The electronic key system as claimed in claim 1, wherein the predetermined function includes at least one of a function of turning on a predetermined light of a vehicle and a function of entering a state of being able to unlock a door of the vehicle in response to a predetermined operation being performed.

7. The electronic key system as claimed in claim 2, wherein the predetermined function includes at least one of a function of turning on a predetermined light of a vehicle and a function of entering a state of being able to unlock a door of the vehicle in response to a predetermined operation being performed.

8. The electronic key system as claimed in claim 3, wherein the predetermined function includes at least one of a function of turning on a predetermined light of a vehicle and a function of entering a state of being able to unlock a door of the vehicle in response to a predetermined operation being performed.

9. The electronic key system as claimed in claim 4, wherein the predetermined function includes at least one of a function of turning on a predetermined light of a vehicle and a function of entering a state of being able to unlock a door of the vehicle in response to a predetermined operation being performed.

10. The electronic key system as claimed in claim 5, wherein
the predetermined function includes at least one of a function of turning on a predetermined light of a vehicle and a function of entering a state of being able to unlock a door of the vehicle in response to a predetermined operation being performed.

\* \* \* \* \*